United States Patent
Yu et al.

(10) Patent No.: US 11,549,271 B2
(45) Date of Patent: Jan. 10, 2023

(54) ANTI-SLIP FLOORTILE

(71) Applicant: Shanghai Jinka Flooring Technology Co., LTD., Shanghai (CN)

(72) Inventors: Hsiung-Tieh Yu, Shanghai (CN); Stephen Chang, Shanghai (CN)

(73) Assignee: SHANGHAI JINKA FLOORING TECHNOLOGY CO., LTD., Shanghai (CN)

( * ) Notice: Subject to any disclaimer, the term of this patent is extended or adjusted under 35 U.S.C. 154(b) by 398 days.

(21) Appl. No.: 16/727,839

(22) Filed: Dec. 26, 2019

(65) Prior Publication Data
US 2020/0208414 A1    Jul. 2, 2020

(30) Foreign Application Priority Data
Dec. 29, 2018 (CN) .......................... 201811644610.X (51) Int. Cl.
 *B32B 3/10* (2006.01)
 *E04F 15/10* (2006.01)

(52) U.S. Cl.
 CPC .......... *E04F 15/102* (2013.01); *E04F 15/107* (2013.01)

(58) Field of Classification Search
 None
 See application file for complete search history.

(56) References Cited

U.S. PATENT DOCUMENTS

| | | | |
|---|---|---|---|
| 2007/0103902 A1 | 5/2007 | Hsiao | |
| 2010/0297394 A1* | 11/2010 | Peace | D06N 7/0055 428/145 |
| 2016/0016390 A1 | 1/2016 | Lundblad et al. | |
| 2017/0022388 A1 | 1/2017 | Zhang | |

FOREIGN PATENT DOCUMENTS

| | | | | |
|---|---|---|---|---|
| CN | 102733576 A | * | 10/2012 | |
| CN | 102733576 A | | 10/2012 | |
| CN | 103711281 A | | 4/2014 | |
| CN | 106368413 A | * | 2/2017 | ............ B29B 11/12 |
| CN | 106368413 A | | 2/2017 | |
| CN | 108026730 A | | 5/2018 | |
| CN | 108222410 A | | 6/2018 | |
| JP | 62063759 A | * | 3/1987 | |
| JP | 2014218838 A | * | 11/2014 | |
| JP | 2017-141665 A | | 8/2017 | |
| WO | 2015/105168 A1 | | 7/2015 | |

OTHER PUBLICATIONS

Machine translation of CN-102733576-A (Year: 2012).*
Machine translation of CN-106368413-A (Year: 2017).*
Machine translation of JP-2014218838-A (Year: 2014).*
Machine translation of JP-62063759-A (Year: 1987).*

* cited by examiner

*Primary Examiner* — Christopher M Polley
(74) *Attorney, Agent, or Firm* — Cheng-Ju Chiang (57) ABSTRACT

The present disclosure provides an anti-slip floor tile including a base layer, a decorative layer on the base layer, and a wear resistant layer on the decorative layer. The wear resistant layer includes a non-rigid or semi-rigid thermoplastic resin, and a plurality of first mineral particles uniformly distributed inside the thermoplastic resin. The present disclosure can improve the wear resistance of the anti-slip floor tile by dispersing the first mineral particles in the wear resistant layer.

14 Claims, 2 Drawing Sheets

ANTI-SLIP FLOORTILE

CROSS-REFERENCE TO RELATED APPLICATION

The present application is based on and claims priority of Chinese Patent Application No. 201811644610.X, filed on Dec. 29, 2018, applied by SHANGHAI JINKA FLOORING TECHNOLOGY CO., LTD., and entitled "ANTI-SLIP FLOORTILE".

TECHNICAL FIELD

The present disclosure relates to decorative materials, and more particular to an anti-slip floor tile.

BACKGROUND

With the development of society and the improvement of living standards, requirements in aesthetics and safety of interior decorations are gradually increased. As one of the most important components of interior decorations, floor tiles have naturally obtained more attention. At present, the floor tiles on the market include ceramic tile, wood floor, laminate floor, PVC floor, and the like. The ceramic tiles are wear-resistant and durable, but are not anti-slip, especially in the case of water, which causes people are easy to slip down. Because the ceramic tiles are hard, people are easily injured after slipping down, therefore, the ceramic tiles are not suitable for use in places with children, the elderly and the water. Compared with the ceramic tiles, wood floors have better performance in slip resistance, but since wood floors are not water resistant, they are not suitable for use in places with water.

Figure 1:
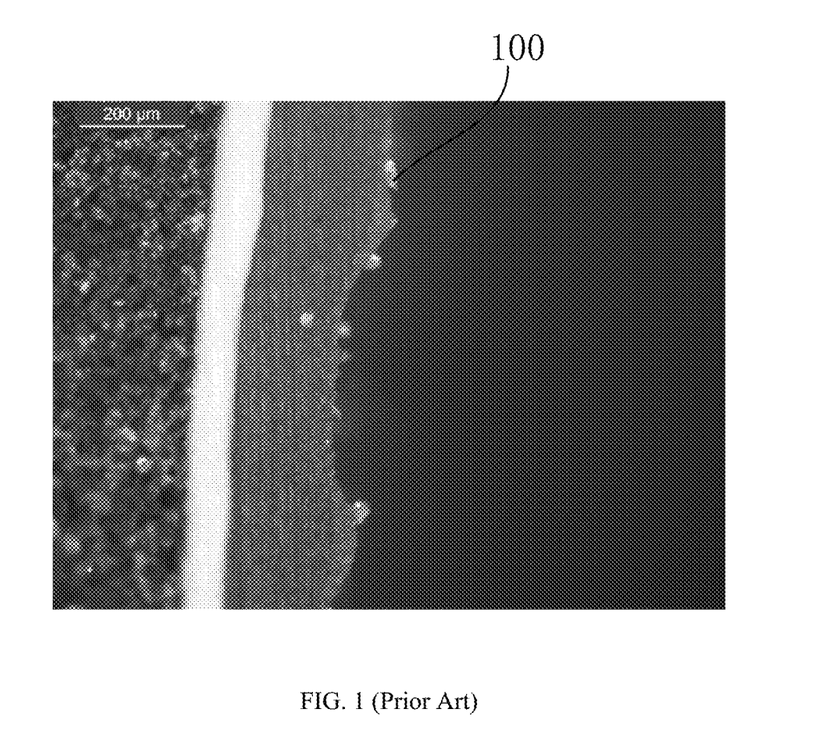
FIG. 1 is a schematic view showing a laminate structure of a conventional anti-slip floor tile.

Due to the poor anti-slip effect of ordinary PVC floor tiles, when pedestrians step on them, they will fall easily because of slipping, especially if the ground is inadvertently wet, it will be more dangerous. In order to increase the slip resistance, the surface of the floor tile is usually deep embossed, or made of knitted fabrics, to increase the roughness and improve the anti-slip performance, but the slip resistance of the surface of the floor tile is greatly reduced under the wet condition, for example, the ground is wet by liquid such as water. As shown in FIG. 1, a conventional anti-slip PVC floor tile is provided with a sandblasted rough layer 100 on the surface of the floor tile. Although the sandblasted rough layer 100 has anti-slip performance, it is easy to be separated from the main body of the floor tile when subjected to external force for a long time, which will cause user confusion.

The preceding description is provided to provide general background information and does not necessarily constitute prior art.

SUMMARY

The embodiments of the present disclosure provide an anti-slip floor tile.

The anti-slip floor tile of the present disclosure includes a base layer, a decorative layer on the base layer, and a wear resistant layer on the decorative layer. The wear resistant layer includes a non-rigid or semi-rigid thermoplastic resin, and a plurality of first mineral particles uniformly distributed inside the thermoplastic resin.

In an embodiment of the present disclosure, if the thermoplastic resin is a non-rigid thermoplastic resin, a flexural modulus or a tensile modulus of the thermoplastic resin is less than 70 MPa. If the thermoplastic resin is a semi-rigid thermoplastic resin, a flexural modulus or a tensile modulus of the thermoplastic resin is from 70 MPa to 700 MPa.

In an embodiment of the present disclosure, the wear resistant layer includes 25% to 45% of the plasticizer, 50% to 65% of the thermoplastic resin, 10% to 30% of the first mineral particles, and 1% to 5% of the other additives.

In an embodiment of the present disclosure, the first mineral particles are alumina particles, silica particles, glass sand or silicon carbide particles.

In an embodiment of the present disclosure, the first mineral particles have a Mohs hardness of not less than 6.

In an embodiment of the present disclosure, the first mineral particles have a particle size of 0.05 mm to 1.0 mm and a diameter of largest particles is less than or substantially equal to a thickness of the wear resistant layer.

In an embodiment of the present disclosure, the surface of the first mineral particles is coated with a surface modification layer, and the surface modification layer is a coupling agent modification layer.

In an embodiment of the present disclosure, the anti-slip floor tile further includes a coating layer on the wear resistant layer.

In an embodiment of the present disclosure, the coating layer includes 20% to 50% of poly urethane acrylate prepolymer, 20% to 40% of acrylate monomer, 0.5% to 3.0% of fluorosilane, 2% to 8% of photoinitiator, 0.5% to 5% of wetting agent.

In an embodiment of the present disclosure, the coating layer includes a plurality of second mineral particles uniformly dispersed in the coating layer.

In an embodiment of the present disclosure, the second mineral particles have a particle size of 0.01 mm to 0.04 mm and a diameter of the second mineral particles is greater than or equal to a thickness of the coating layer.

In an embodiment of the present disclosure, the coating layer includes a plurality of water absorbing particles or hydrogel monomers uniformly dispersed in the coating layer.

The present disclosure has at least one of the following advantages:

1. The floor tile has good anti-slip performance by uniformly distributing mineral particles in the surface layer (the wear resistant layer or the coating layer) of the floor tile.

2. In some embodiments of the present disclosure, the mineral particles are distributed in both of the wear resistant layer and the coating layer, so that the floor tile could keep the anti-slip performance throughout the life cycle of the floor tile, even though the surface of the floor tile of the present disclosure loses the anti-slip effect because of the abrasion of the surface embossing pattern and the coating layer.

3. In some embodiments of the present disclosure, the mineral particles in the wear resistant layer are always tightly bonded to the thermoplastic resin, which can avoid the interface separation between the mineral particles and the thermoplastic resin due to temperature decrease, and improve the low temperature resistance of the anti-slip floor tile.

4. In some embodiments of the present disclosure, the arrangement of the hydrogel monomer or the water absorbing particles enables the anti-slip floor tile of the present disclosure to have an excellent anti-slip effect in a region as a sink, a bathroom, a kitchen, or the like, where water is easily splashed.

In order to make the abovementioned purposes, characteristics and advantages be more apparent and understandable, detailed descriptions accompanying preferred embodiments are given below.

DETAILED DESCRIPTION OF PREFERRED EMBODIMENTS

Embodiments of the present disclosure will now be described more apparently and completely with reference to the embodiments. Obviously, the illustrated embodiments are only a part but not all of the embodiments of the present disclosure. All the other embodiments which could be obtained without creativity by one of ordinary skill in the art according to the illustrated embodiments would be claimed within the scope of the present disclosure.

First Embodiment

Figure 2:
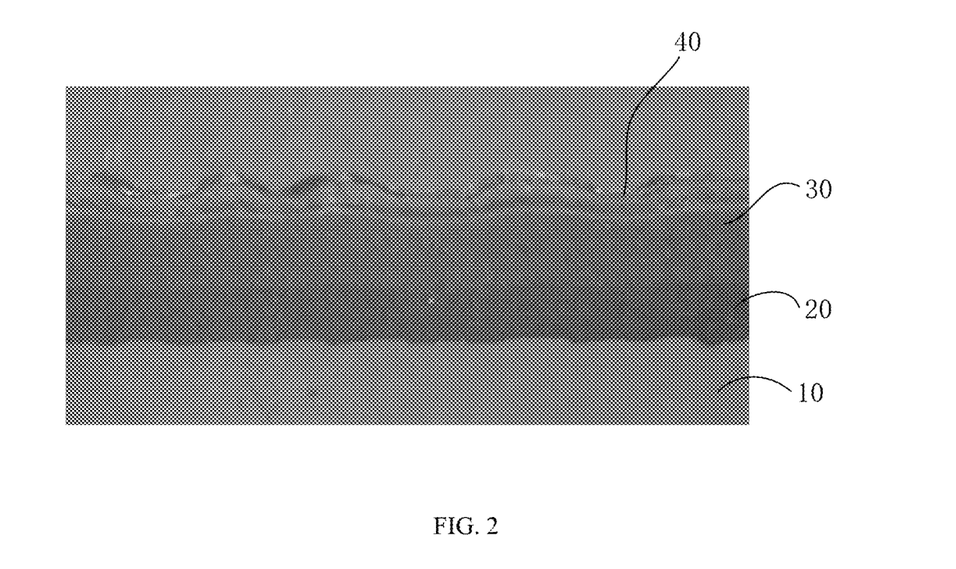
FIG. 2 is a schematic view showing a laminate structure of an anti-slip floor tile according to an embodiment of the present disclosure, and the first mineral particles are not shown.

Referring to FIG. 2, an anti-slip floor tile of an embodiment of the present disclosure includes a wear resistant layer 30, a decorative layer 20 and a base layer 10. The wear resistant layer 30, the decorative layer 20 and the base layer 10 are sequentially disposed from top to bottom.

In the present disclosure, the decorative layer 20 is made of a plastic thin film and has a thickness of 0.05 mm to 0.1 mm. A top surface of the decorative layer 20 is coated with ink to form a decorative pattern of the anti-slip floor tile, to provide a visual effect and a decorative effect for the anti-slip floor tile.

The base layer 10 is disposed under and in direct contact with the decorative layer 20. The base layer 10 may be formed by mixing and calendaring PVC powder, a plasticizer, an additive and a filler together.

The wear resistant layer 30 is disposed above and in direct contact with the decorative layer 20. The wear resistant layer 30 is composed by a layer of non-rigid or semi-rigid plastic film, and has a thickness of 0.1 mm to 1 mm. In the present disclosure, the non-rigid plastic refers to a plastic having a flexural modulus or a tensile modulus (when the flexural modulus is not applicable) of lower than 70 MPa in specified conditions. The semi-rigid plastic refers to a plastic having a flexural modulus or a tensile modulus (when the flexural modulus is not applicable) from 70 MPa to 700 MPa in specified conditions.

Figure 4:
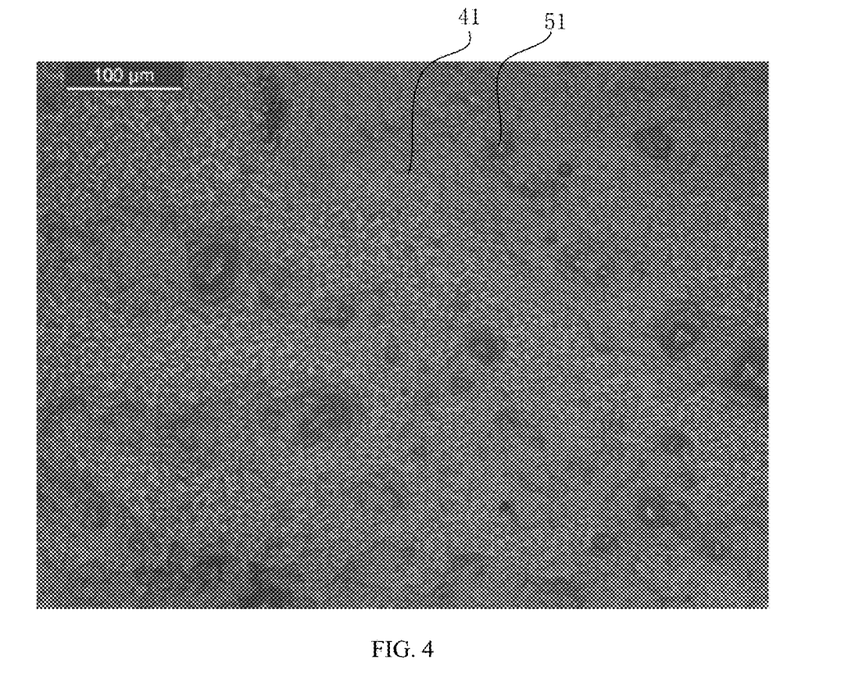
FIG. 4 is a schematic, electron microscope view showing a surface structure of the anti-slip floor tile of FIG. 3.

A material of the wear resistant layer 30 includes a plasticizer, a thermoplastic resin, a plurality of first mineral particles, and other additives. The wear resistant layer 30 includes 25% to 45% of the plasticizer, 50% to 65% of the thermoplastic resin, 10% to 30% of the first mineral particles, and 1% to 5% of the other additives. The mass percentage of the components of the wear resistant layer 30 are given to the above value, so that the floor tile could have a good slip resistance, a good wear resistance, a good scratch resistance and a good conformability. In this embodiment, the plasticizer may be a solid plasticizer, a liquid plasticizer, or a mixture of a solid plasticizer and a liquid plasticizer. The solid plasticizer includes at least one of EPDM (Ethylene Propylene Diene Monomer), modified TPU (Thermoplastic polyurethanes), modified PU (polyurethane) and modified PP (Polypropylene). The liquid plasticizer includes at least one of a phthalate plasticizer, a fatty acid ester plasticizer, an aliphatic dibasic acid plasticizer, a phosphate plasticizer, an epoxy compound plasticizer, a chlorine-containing plasticizer, and a trimellitate plasticizer. In this embodiment, the thermoplastic resin is PVC powder. The other additives may be at least one of usual additives for PVC, such as a stabilizer, a flame retardant, a smoke suppressant, and an antioxidant. The first mineral particles may be inorganic mineral particles such as alumina particles, silica particles, glass sand or silicon carbide particles. The first mineral particles may have a Mohs hardness of not less than 6, and the shape may be an irregular or a regular shape. In the present embodiment, the first mineral particles are dispersed in the thermoplastic resin and have a particle size of 0.05 mm to 1.0 mm, with a diameter of the largest particles being smaller than or substantially equal to the thickness of the wear resistant layer 30. In this embodiment, the first mineral particles are added in an amount of 10% to 30%, so that the first mineral particles can be stably wrapped by the thermoplastic resin, to obtain a uniform and smooth wear resistant layer 30, and these first mineral particles can act as an anti-slip and wear resistant skeleton of the wear resistant layer 30. In order to further increase the anti-slip effect of the anti-slip floor tile, the surface of the wear resistant layer 30 is further pressed by an embossing plate to form a deep embossing pattern 40. The deep embossing pattern 40 may be configured in wave shape with embossing stripes of the deep embossing pattern 40 having a depth from 0.1 mm to 0.8 mm, for example, 0.3 mm. It can be understood that the surface of the wear resistant layer 30 can also has a shallow embossing pattern 41 as shown in FIG. 4, the shallow embossing pattern 41 is a substantially flat pattern, with depths of embossing stripes of the shallow embossing pattern 41 being less than 0.05 mm.

Furthermore, the surface of the first mineral particles of the present embodiment is coated with a surface modification layer. In the process of producing the wear resistant layer 30, the first mineral particles are first subjected to a surface modification treatment (for example, the surface of the first mineral particles is modified by a coupling agent), and the first mineral particles are further uniformly mixed with the plasticizer, the thermoplastic resin and the other additives and rolled or extruded into sheets. Since the first mineral particles are embedded in the thermoplastic resin of the wear resistant layer 30 when the thermoplastic resin is in its plasticized state (i.e., melt state) at a high temperature, and are enclosed in the thermoplastic resin after cooling, a strong bonding strength are generated between the first mineral particles and the thermoplastic resin, thereby preventing the first mineral particles from separating from the thermoplastic resin due to different shrinkage of the first mineral particles and the thermoplastic resin. If the first mineral particles are not subjected to the surface modification treatment, the thermoplastic resin and the first mineral particles in the wear resistant layer 30 are bonded together by molecular chains, when the temperature is decreased (for example, to a temperature lower than 15° C.), the intermolecular strength is drastically decreased due to the increase of the distance between the molecules. Therefore, the thermoplastic resin and the first mineral particles are liable to cause interface separation due to inconsistent shrinkage, so that the first mineral particles are exposed outside, thereby causing the particles to fall off when the floor tile is used at low temperatures (less than 15° C., especially in winter), and accordingly reducing the anti-slip effect of the floor tile. If the first mineral particles are subjected to the surface modification treatment, the thermoplastic resin and the surface modification layer of the first mineral particles are bonded together by chemical chains, and the bonding strength is greatly improved and will not cause interface separation due to temperature decrease.

As an example of the surface modification treatment of the first mineral particles, one embodiment of the present disclosure performs surface modification treatment of the first mineral particles by silane coupling agent. The molecular formula of most silane coupling agents can be expressed as Y—R—SiX3, and its greatest feature is that there are two groups with different functions and different properties contained in the same molecule, wherein X is a group, such as a siloxy group, an acetoxy group, a halogen, or etc., which is capable of undergoing a hydrolysis reaction to form a silyl group (Si—OH), and X has the ability to bond with inorganic substances such as glass and silica; Y is an organic group, such as a vinyl group, an amino group, an epoxy group, or etc., which is capable of reacting with a polymer to increase the reactivity and compatibility of the silane with the polymer; R is a carbon chain having a saturated or unsaturated bond, through which Y and Si atoms are connected. Since there are two functional groups with organophilic capability and hydrophilic capability in the molecule of the silane coupling agent, it can be used as a "molecular bridge" for connecting inorganic materials and organic materials, and connecting two kinds of materials with different properties to form a coupling layer of inorganic phase-silane coupling agent-organic phase, thereby increasing the bonding strength between the thermoplastic resin and the first mineral particles.

As an example of the surface modification treatment of the first mineral particles, another embodiment of the present disclosure performs surface modification treatment of the first mineral particles by an aluminate coupling agent. Similar as the silane coupling agent, the aluminate coupling agent includes two kinds of active groups in the molecule, with one kind of the active group can interact with the surface of the inorganic first mineral particles, and the other kind can be entangled with the resin molecules, thereby generating a coupling action between the first mineral particles and the thermoplastic resin, and increasing the bonding strength between the first mineral particles and the thermoplastic resin to prevent interface separation due to temperature decrease.

It can be understood from the above description that, in the present disclosure, when the floor tile is subjected to an external force (for example, a person walks on the floor tile), the thermoplastic resin is pressed and become thinner, while the first mineral particles are substantially not deformed, so that the first mineral particles could protrude out from the surface of the thermoplastic resin, and increase the roughness of the surface of the floor tile and the friction between the floor tile and the sole. Since the hardness of the thermoplastic resin is lower than the hardness of the first mineral particles, the wear resistance of the thermoplastic resin is lower than the wear resistance of the first mineral particles. After long-term use, the abrasion of the thermoplastic resin is slightly faster than the first mineral particles, and a part of the first mineral particles will protrude out from the surface of the thermoplastic resin, and a three-dimensional layering feeling will be exhibited on the surface of the floor tile and the floor tile will be more wear-resistant and anti-slip.

Further, the surface-modified first mineral particles can be chemically bonded to the thermoplastic resin, so that the bonding strength between the first mineral particles and the thermoplastic resin can be greatly improved, and the interface separation generated between the first mineral particles and the thermoplastic resin due to temperature decrease can be avoided.

Second Embodiment

Figure 3:
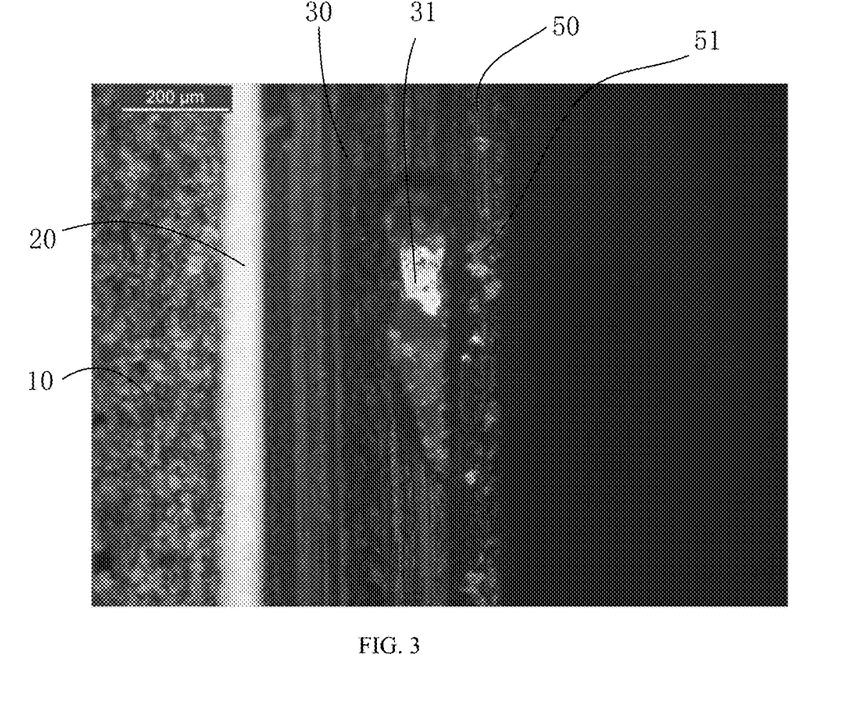
FIG. 3 is a schematic, electron microscope view showing a laminate structure of an anti-slip floor tile according to another embodiment of the present disclosure.

Referring to FIG. 3, the anti-slip floor tile provided in an embodiment of the present disclosure includes a coating layer 50, a wear resistant layer 30, a decorative layer 20 and a base layer 10. The coating layer 50, the wear resistant layer 30, the decorative layer 20 and the base layer 10 are sequentially disposed from top to bottom.

In the present disclosure, the decorative layer 20 is made of a plastic film and has a thickness of 0.05 mm to 0.1 mm. The top surface of the decorative layer 20 is coated with ink to form a decorative pattern of the anti-slip floor tile, to provide a visual effect and a decorative effect for the anti-slip floor tile.

The base layer 10 is disposed under and in direct contact with the decorative layer 20. The base layer 10 may be formed by mixing and calendaring PVC powder, a plasticizer, an additive, and a filler together.

The wear resistant layer 30 is disposed above and in direct contact with the decorative layer 20. The wear resistant layer 30 is composed by a layer of non-rigid or semi-rigid plastic film and has a thickness of 0.1 mm to 1 mm. In the present disclosure, the non-rigid plastic refers to a plastic having a flexural modulus or a tensile modulus (when the flexural modulus is not applicable) of lower than 70 MPa in specified conditions. The semi-rigid plastic refers to a plastic having a flexural modulus or a tensile modulus (when the flexural modulus is not applicable) from 70 MPa to 700 MPa in specified conditions.

A material of the wear resistant layer 30 includes a plasticizer, a thermoplastic resin, a plurality of first mineral particles 31, and other additives. The wear resistant layer 30 includes 25% to 45% of the plasticizer, 50% to 65% of the thermoplastic resin, 10% to 30% of the first mineral particles 31, and 1% to 5% of the other additives. The components of the wear resistant layer 30 are given to the above value, so that the floor tile could have a good slip resistance, a good wear resistance, a good scratch resistance and a good conformability. In this embodiment, the plasticizer may be a solid plasticizer, a liquid plasticizer, or a mixture of a solid plasticizer and a liquid plasticizer. The solid plasticizer includes at least one of EPDM (Ethylene Propylene Diene Monomer), modified TPU (Thermoplastic polyurethanes), modified PU (polyurethane) and modified PP (Polypropylene). The liquid plasticizer includes at least one of a phthalate plasticizer, a fatty acid ester plasticizer, an aliphatic dibasic acid plasticizer, a phosphate plasticizer, an epoxy compound plasticizer, chlorine-containing plasticizer, and a trimellitate plasticizer. In this embodiment, the thermoplastic resin is PVC powder. The other additives may be at least one of usual additives for PVC such as a stabilizer, a flame retardant, a smoke suppressant, and an antioxidant. The first mineral particles 31 may be inorganic mineral particles such as alumina particles, silica particles, glass sand or silicon carbide particles. The first mineral particles 31 have a Mohs hardness of not less than 6, and the shape may be an irregular or regular shape. In the present embodiment, the first mineral particles 31 are dispersed in the thermoplastic resin and have a particle size of 0.05 mm to 1.0 mm, with a diameter of the largest particles being smaller than or substantially equal to the thickness of the wear resistant layer 30. In the present embodiment, the first mineral particles 31 are added in an amount of 10% to 30%, so that the first mineral particles 31 can be stably wrapped by the thermoplastic resin, to obtain a uniform and smooth wear resistant layer 30, and these first mineral particle 31 can act as an anti-slip and wear resistant skeleton of the wear resistant layer 30.

The coating layer 50 is disposed above and in direct contact with the wear resistant layer 30 and has a thickness of 0.01 mm to 0.02 mm. The coating layer 50 is made of a UV coating, which is an ultraviolet photosensitive urethane acrylate coating. The urethane acrylate coating includes a poly urethane acrylate prepolymer, an acrylate monomer, a fluorosilane, a photoinitiator, and a wetting agent. The UV coating includes 20% to 50% of poly urethane acrylic prepolymer, 20% to 40% of acrylate monomer, 0.5% to 3.0% of fluorosilane, 2% to 8% of photoinitiator, 0.5% to 5% of wetting agent. In this embodiment, the photoinitiator is, for example, 2-hydroxy-2-methyl-1-phenylacetone, the wetting agent is, for example, TEGO Twin4000, and the viscosity of the poly urethane acrylic prepolymer in this embodiment is less than 200 CPS. The surface energy of the acrylate monomer is less than 28, making the UV coating easy to wet the solid surface. The coating layer 50 is formed by laminating a UV coating onto the surface of the wear resistant layer 30 at a temperature of 0 to 10° C. and then curing the UV coating by ultraviolet light.

As shown in FIG. 4, in order to further increase the anti-slip effect of the anti-slip floor tile, the surface of the coating layer 50 of the present embodiment is formed with a shallow embossing pattern 41 with embossing stripes of the shallow embossing pattern 41 having a depth of less than 0.05 mm. It can be understood that, in other embodiments of the present disclosure, the surface of the coating layer 50 can also be pressed by an embossing plate to form a wavy deep embossing pattern 40 as shown in FIG. 2, and the depths of embossing stripes of the deep embossing pattern 40 are in a range from 0.1 mm to 0.8 mm, for example 0.3 mm.

In the present embodiment, the composition and the ratio of the composition in the UV coating makes the coating layer 50 have good wettability to the wear resistant layer 30 at a low temperature (in a range from 0 to 10° C.), so that the UV coating can penetrate into the gap between the thermoplastic resin and the first mineral particles 31 of the wear resistant layer 30, thereby preventing the interface separation of the thermoplastic resin and the first mineral particles 31 due to the temperature decrease, and furthermore, the arrangement of the coating layer 50 can improve the surface gloss of the anti-slip floor tile.

Third Embodiment

Referring to FIG. 3, an anti-slip floor tile provided in an embodiment of the present disclosure includes a coating layer 50, a wear resistant layer 30, a decorative layer 20 and a base layer 10. The coating layer 50, the wear resistant layer 30, the decorative layer 20, and the base layer 10 are sequentially disposed from top to bottom.

In the present disclosure, the decorative layer 20 is made of a plastic film and has a thickness of 0.05 mm to 0.1 mm. A top surface of the decorative layer 20 is coated with ink to from a decorative pattern of the anti-slip floor tile, to provide a visual effect and a decorative effect for the anti-slip floor tile.

The base layer 10 is disposed under and in direct contact with the decorative layer 20. The base layer 10 may be formed by mixing and calendaring PVC powder, a plasticizer, an additive, and a filler together.

The wear resistant layer 30 is disposed above and in direct contact with the decorative layer 20. The wear resistant layer 30 is composed of a layer of non-rigid or semi-rigid plastic film, and has a thickness of 0.1 mm to 1 mm. In the present disclosure, the non-rigid plastic refers to a plastic having a flexural modulus or a tensile modulus (when the flexural modulus is not applicable) of lower than 70 MPa in specified conditions. The semi-rigid plastic refers to a plastic having a flexural modulus or a tensile modulus (when the flexural modulus is not applicable) from 70 MPa to 700 MPa in specified conditions.

A material of the wear resistant layer 30 includes a plasticizer, a thermoplastic resin, a plurality of first mineral particles 31, and other additives. The wear resistant layer 30 includes 25% to 45% of the plasticizer, 50% to 65% of the thermoplastic resin, 10% to 30% of the first mineral particles 31, and 1% to 5% of the other additives. The mass percentage of the components of the wear resistant layer 30 are given to the above value, so that the floor tile could have a good slip resistance, a good wear resistance, a good scratch resistance and a good conformability. In this embodiment, the plasticizer may be a solid plasticizer, a liquid plasticizer, or a mixture of a solid plasticizer and a liquid plasticizer. The solid plasticizer includes at least one of EPDM (Ethylene Propylene Diene Monomer), modified TPU (Thermoplastic polyurethanes), modified PU (polyurethane) and modified PP (Polypropylene). The liquid plasticizer includes at least one of a phthalate plasticizer, a fatty acid ester plasticizer, an aliphatic dibasic acid plasticizer, a phosphate plasticizer, an epoxy compound plasticizer, chlorine-containing plasticizer, and a trimellitate plasticizer. In this embodiment, the thermoplastic resin is PVC powder. The other additives may be at least one of usual additives for PVC, such as a stabilizer, a flame retardant, a smoke suppressant, and an antioxidant. The first mineral particles 31 may be inorganic mineral particles such as alumina particles, silica particles, glass sand or silicon carbide particles. The first mineral particles 31 may have a Mohs hardness of not less than 6, and the shape may be an irregular or a regular shape. In the present embodiment, the first mineral particles 31 are dispersed in a thermoplastic resin and have a particle size of 0.05 mm to 1.0 mm, with the diameter of the largest particles being smaller than or substantially equal to the thickness of the wear resistant layer 30. In the present embodiment, the first mineral particles 31 are added in an amount of 10% to 30%, so that the first mineral particles 31 can be stably wrapped by the thermoplastic resin, to obtain a uniform and smooth wear resistant layer 30, and these first mineral particle 31 can act as an anti-slip and wear resistant skeleton of the wear resistant layer 30.

The coating layer 50 is disposed above and in direct contact with the wear resistant layer 30 and has a thickness of 0.01 mm to 0.02 mm. The coating layer 50 is made of a UV coating, which is an ultraviolet photosensitive urethane acrylate coating. The urethane acrylate coating includes a poly urethane acrylate prepolymer, an acrylate monomer, a fluorosilane, a photoinitiator, and a wetting agent. The UV coating includes 20% to 50% of poly urethane acrylate prepolymer, 20% to 40% of acrylate monomer, 0.5% to 3.0% of fluorosilane, 2% to 8% of photoinitiator, 0.5% to 5% of wetting agent. In this embodiment, the photoinitiator is, for example, 2-hydroxy-2-methyl-1-phenylacetone, the wetting agent is, for example, TEGO Twin4000, and the viscosity of the poly urethane acrylate prepolymer in this embodiment is less than 200 CPS. The surface energy of the acrylate monomer is less than 28, making the UV coating easy to wet the solid surface.

Furthermore, the coating layer 50 further includes a plurality of second mineral particles 51 uniformly dispersed in the coating layer 50. The second mineral particles 51 may be inorganic mineral particles such as alumina particles, silica particles, glass sand or silicon carbide particles. The second mineral particles 51 have a Mohs hardness of not less than 6, and the shape may be an irregular or a regular shape. The diameter of the second mineral particle 51 is in a range from 0.01 mm to 0.04 mm, and the diameter of the second mineral particles 51 is greater than or equal to the thickness of the coating layer 50, so that a part of the second mineral particles 51 is exposed outside the surface of the coating layer 50, and increase the anti-slip of the floor tile. In the laminating operation, the second mineral particles 51 are added into the UV coating in a predetermined ratio (for example, the mass percentage of the second mineral particles 51 to the UV coating is from 30:100 to 50:100), and stirred uniformly, and then coated and cured.

The composition and the ratio of the composition in the UV coating makes the coating layer 50 have good wettability to the wear resistant layer 30 at a low temperature (in a range from 0 to 10° C.), so that the UV coating can penetrate into the gap between the thermoplastic resin and the mineral particles of the wear resistant layer 30, thereby preventing the interface separation of the thermoplastic resin and the mineral particles due to the temperature decrease, and furthermore, the arrangement of the coating layer 50 can improve the surface wear resistance and surface gloss of the floor tile.

As shown in FIG. 4, in order to further increase the anti-slip effect of the anti-slip floor tile, the surface of the coating layer 50 of the present embodiment is formed with a shallow embossing pattern 41 with embossing stripes of the shallow embossing pattern 41 having a depth of less than 0.05 mm. It can be understood that, in other embodiments of the present disclosure, the surface of the coating layer 50 can also be pressed by an embossing plate to form a wavy deep embossing pattern 40 as shown in FIG. 2, and the depths of embossing stripes of the deep embossing pattern 40 are in a range from 0.1 mm to 0.8 mm, for example 0.3 mm.

In summary, the anti-slip floor tile of the present embodiment forms a coating layer 50 containing the second mineral particles 51 on the surface of the wear resistant layer 30, and a shallow embossing pattern 41 or a deep embossing pattern 40 on the surface of the coating layer 50, to increase the wear resistance of the anti-slip floor tile. Furthermore, due to the coating layer 50 have good wettability to the wear resistant layer 30 at low temperature, the low temperature resistance of the anti-slip floor tile is increased.

Fourth Embodiment

Referring to FIG. 3, an anti-slip floor tile provided in an embodiment of the present disclosure includes a coating layer 50, a wear resistant layer 30, a decorative layer 20 and a base layer 10. The coating layer 50, the wear resistant layer 30, the decorative layer 20, and the base layer 10 are sequentially disposed from top to bottom.

In the present disclosure, the decorative layer 20 is made of a plastic film and has a thickness of 0.05 mm to 0.1 mm. The top surface of the decorative layer 20 is coated with ink to form a decorative pattern of the anti-slip floor tile, to provide a visual effect and a decorative effect for the anti-slip floor tile.

The base layer 10 is disposed under and in direct contact with the decorative layer 20. The base layer 10 may be formed by mixing and calendaring PVC powder, a plasticizer, an additive, and a filler together.

The wear resistant layer 30 is disposed above and in direct contact with the decorative layer 20. The wear resistant layer 30 is composed of a layer of non-rigid or semi-rigid plastic film having a thickness of 0.1 mm to 1 mm. In the present disclosure, the non-rigid plastic refers to a plastic having a flexural modulus or a tensile modulus (when the flexural modulus is not applicable) of lower than 70 MPa in specified conditions. The semi-rigid plastic refers to a plastic having a flexural modulus or a tensile modulus (when the flexural modulus is not applicable) from 70 MPa to 700 MPa in specified conditions.

A material of the wear resistant layer 30 includes a plasticizer, a thermoplastic resin, a plurality of first mineral particles 31, and other additives. The wear resistant layer 30 includes 25% to 45% of the plasticizer, 50% to 65% of the thermoplastic resin, 10% to 30% of the first mineral particles 31, and 1% to 5% of the other additives. The mass percentage of the components of the wear resistant layer 30 are given to the above value, so that the floor tile could have a good slip resistance, a good wear resistance, a good scratch resistance and a good conformability. In this embodiment, the plasticizer may be a solid plasticizer, a liquid plasticizer, or a mixture of a solid plasticizer and a liquid plasticizer. The solid plasticizer includes at least one of EPDM (Ethylene Propylene Diene Monomer), modified TPU (Thermoplastic polyurethanes), modified PU (polyurethane) and modified PP (Polypropylene). The liquid plasticizer includes at least one of a phthalate plasticizer, a fatty acid ester plasticizer, an aliphatic dibasic acid plasticizer, a phosphate plasticizer, an epoxy compound plasticizer, chlorine-containing plasticizer, and a trimellitate plasticizer. In this embodiment, the thermoplastic resin is PVC powder. The other additives may be at least one of usual additives for PVC such as a stabilizer, a flame retardant, a smoke suppressant, and an antioxidant. The first mineral particles 31 may be inorganic mineral particles such as alumina particles, silica particles, glass sand or silicon carbide particles, and may have a Mohs hardness of not less than 6, and the shape of the first mineral particles 31 may be an irregular or a regular shape. In the present embodiment, the first mineral particles 31 are dispersed in a thermoplastic resin and have a particle size of 0.05 mm to 1.0 mm, with the diameter of the largest particles being smaller than or substantially equal to the thickness of the wear resistant layer 30. In the present embodiment, the first mineral particles 31 are added in an amount of 10% to 30%, so that the first mineral particles 31 can be stably wrapped by the thermoplastic resin, to obtain a uniform and smooth wear resistant layer 30, and these first mineral particle 31 can be anti-slip and act as a wear resistant skeleton of the wear resistant layer 30.

Furthermore, the surface of the first mineral particles 31 is coated with a surface modification layer. In the process of producing the wear resistant layer 30, the first mineral particles 31 are first subjected to a surface modification treatment (for example, the surface of the first mineral particles 31 is modified by a coupling agent), and the first mineral particles 31 are further uniformly mixed with the plasticizer, the thermoplastic resin and the other additives, and rolled or extruded into sheets. Since the first mineral particles 31 of the wear resistant layer 30 are embedded in the thermoplastic resin when the thermoplastic resin is in its plasticized state (i.e., melt state) at a high temperature, and are enclosed in the thermoplastic resin after cooling, a strong bonding strength are generated between the first mineral particles 31 and the thermoplastic resin, thereby preventing the first mineral particles 31 from separating from the thermoplastic resin due to different shrinkage of the first mineral particles 31 and the thermoplastic resin. If the first mineral particles 31 are not subjected to the surface modification treatment, the thermoplastic resin and the first mineral particles 31 in the wear resistant layer 30 are bonded together by molecular chains, when the temperature is decreased (for example, to a temperature lower than 15° C.), the intermolecular strength is drastically decreased due to the increase of the distance between the molecules. Therefore, the thermoplastic resin and the first mineral particles 31 are liable to cause interface separation due to inconsistent shrinkage, so that the first mineral particles 31 are exposed outside, thereby causing the particles to fall off when the floor tile is used at low temperatures (less than 15° C., especially in winter), and accordingly reducing the anti-slip effect of the floor tile. If the first mineral particles 31 are subjected to the surface modification treatment, the thermoplastic resin and the surface modified layer of the first mineral particles 31 are bonded together by chemically chains, and the bonding strength is greatly improved and will not cause interface separation due to temperature decrease.

The coating layer 50 is disposed above and in direct contact with the wear resistant layer 30 and has a thickness of 0.01 mm to 0.02 mm. The coating layer 50 is made of a UV coating, which is an ultraviolet photosensitive urethane acrylate coating. The urethane acrylate coating includes a poly urethane acrylate prepolymer, an acrylate monomer, a fluorosilane, a photoinitiator, and a wetting agent. The UV coating includes 20% to 50% of poly urethane acrylic prepolymer, 20% to 40% of acrylate monomer, 0.5% to 3.0% of fluorosilane, 2% to 8% of photoinitiator, 0.5% to 5% of wetting agent. In this embodiment, the photoinitiator is, for example, 2-hydroxy-2-methyl-1-phenylacetone, the wetting agent is, for example, TEGO Twin4000, and the viscosity of the poly urethane acrylic prepolymer in this embodiment is less than 200 CPS. The surface energy of the acrylate monomer is less than 28, making the UV coating easy to wet the solid surface.

Furthermore, the coating layer 50 further includes a plurality of second mineral particles 51 uniformly dispersed in the coating layer 50. The second mineral particles 51 may be inorganic mineral particles such as alumina particles, silica particles, glass sand or silicon carbide particles, and may have a Mohs hardness of not less than 6, and the second mineral particles 51 may be in an irregular or a regular shape. The diameter of the second mineral particles 51 is in a range from 0.01 mm to 0.04 mm, and the diameter of the second mineral particle 51 is greater than or equal to the thickness of the coating layer 50, so that a part of the second mineral particles 51 is exposed outside the surface of the coating layer 50, and the anti-slip performance of the floor tile is increased. In the laminating operation, the second mineral particles 51 are added into the UV coating in a predetermined ratio (for example, the mass percentage of the second mineral particles 51 to the UV coating is from 30:100 to 50:100), and stirred uniformly, and then coated and cured.

The composition and the ratio of the composition in the UV coating makes the coating layer 50 have good wettability to the wear resistant layer 30 at a low temperature (0 to 10° C.), so that the UV coating can penetrate into the gap between the thermoplastic resin and the first mineral particles 31 of the wear resistant layer 30, thereby preventing the interface separation of the thermoplastic resin and the first mineral particles 31 due to the temperature decrease, and furthermore, the arrangement of the coating layer 50 can improve the surface wear resistance and surface gloss of the floor tile.

As shown in FIG. 4, in order to further increase the anti-slip effect of the anti-slip floor tile, the surface of the coating layer 50 of the present embodiment is formed with a shallow embossing pattern 41 with embossing stripes of the shallow embossing pattern 41 having a depth of less than 0.05 mm. It can be understood that, as shown in FIG. 2, in other embodiments of the present disclosure, the surface of the coating layer 50 can also be pressed by an embossing plate to form a wavy deep embossing pattern 40, and the depths of embossing stripes of the deep embossing pattern 40 are in a range from 0.1 mm to 0.8 mm, for example 0.3 mm.

In summary, the anti-slip floor tile of the present embodiment forms a coating layer 50 containing the second mineral particles 51 on the surface of the wear resistant layer 30, and a shallow embossing pattern 41 or a deep embossing pattern 40 on the surface of the coating layer 50, to increase the wear resistance of the anti-slip floor tile. Furthermore, by performing surface modification treatment on the first mineral particles 31 and adding a coating layer 50 having good wettability to the wear resistant layer 30 at a low temperature on the wear resistant layer 30, and the low temperature resistance of the anti-slip floor tile is increased.

Fifth Embodiment

Referring to FIG. 3, an anti-slip tile provided in an embodiment of the present disclosure includes a coating layer 50, a wear resistant layer 30, a decorative layer 20 and a base layer 10. The coating layer 50, the wear resistant layer 30, the decorative layer 20, and the base layer 10 are sequentially disposed from top to bottom.

In the present disclosure, the decorative layer 20 is made of a plastic film and has a thickness of 0.05 mm to 0.1 mm. A top surface of the decorative layer 20 is coated with ink to form a decorative pattern of the anti-slip floor tile, to provide a visual effect and a decorative effect for the anti-slip floor tile.

The base layer 10 is disposed under and in direct contact with the decorative layer 20. The base layer 10 may be formed by mixing and calendaring PVC powder, a plasticizer, an additive, and a filler together.

The wear resistant layer 30 is disposed above and in direct contact with the decorative layer 20. The wear resistant layer 30 is composed of a layer of non-rigid or semi-rigid plastic film, and has a thickness of 0.1 mm to 1 mm. In the present disclosure, the non-rigid plastic refers to a plastic having a flexural modulus or a tensile modulus (when the flexural modulus is not applicable) of lower than 70 MPa in specified conditions. The semi-rigid plastic refers to a plastic having a flexural modulus or a tensile modulus (when the flexural modulus is not applicable) from 70 MPa to 700 MPa in specified conditions.

A material of the wear resistant layer 30 includes a plasticizer, a thermoplastic resin, a plurality of first mineral particles 31, and other additives. The wear resistant layer 30 includes 25% to 45% of the plasticizer, 50% to 65% of the thermoplastic resin, 10% to 30% of the first mineral particles 31, and 1% to 5% of the other additives. The mass percentage of the components of the wear resistant layer 30 are given to the above value, so that the floor tile could have a good slip resistance, a good wear resistance, a good scratch resistance and a good conformability. In this embodiment, the plasticizer may be a solid plasticizer, a liquid plasticizer, or a mixture of a solid plasticizer and a liquid plasticizer. The solid plasticizer includes at least one of EPDM (Ethylene Propylene Diene Monomer), modified TPU (Thermoplastic polyurethanes), modified PU (polyurethane) and modified PP (Polypropylene). The liquid plasticizer includes at least one of a phthalate plasticizer, a fatty acid ester plasticizer, an aliphatic dibasic acid plasticizer, a phosphate plasticizer, an epoxy compound plasticizer, chlorine-containing plasticizer, and a trimellitate plasticizer. In this embodiment, the thermoplastic resin is PVC powder. The other additives may be at least one of usual additives for PVC, such as a stabilizer, a flame retardant, a smoke suppressant, and an antioxidant. The first mineral particles 31 may be inorganic mineral particles such as alumina particles, silica particles, glass sand or silicon carbide particles, and may have a Mohs hardness of not less than 6, and the shape of the first mineral particles 31 may be an irregular shape or a regular shape. In the present embodiment, the first mineral particles 31 are dispersed in a thermoplastic resin and have a particle size of 0.05 mm to 1.0 mm, with the diameter of the largest particles being smaller than or substantially equal to the thickness of the wear resistant layer 30. In the present embodiment, the first mineral particles 31 are added in an amount of 10% to 30%, so that the first mineral particles 31 can be stably wrapped by the thermoplastic resin, to obtain a uniform and smooth wear resistant layer 30, and these first mineral particle 31 can act as an anti-slip and wear resistant skeleton of the wear resistant layer 30.

The coating layer 50 is disposed above and in direct contact with the wear resistant layer 30 and has a thickness of 0.01 mm to 0.02 mm. The coating layer 50 is made of a UV coating, which is an ultraviolet photosensitive urethane acrylate coating. The urethane acrylate coating includes a poly urethane acrylate prepolymer, an acrylate monomer, a fluorosilane, a photoinitiator, a wetting agent, and a hydrogel monomer (such as a NIPAM (N-isopropylacrylamide) monomer). The UV coating includes 20% to 50% of poly urethane acrylate prepolymer, 20% to 40% of acrylate monomer, 0.5% to 3.0% of fluorosilane, 2% to 8% of photoinitiator, 0.5% to 5% of wetting agent, and 5% to 50% of hydrogel monomer. In this embodiment, the photoinitiator is, for example, 2-hydroxy-2-methyl-1-phenylacetone, the wetting agent is, for example, TEGO Twin4000, and the viscosity of the poly urethane acrylate prepolymer in this embodiment is less than 200 CPS. The surface energy of the acrylate monomer is less than 28, making the UV coating easy to wet the solid surface.

In this embodiment, the hydrogel monomer in the coating layer 50 can protrude out from the surface of the coating layer 50 due to water absorption, and plays a role of anti-slip, so that the anti-slip floor tile of the present disclosure has excellent anti-slip effect in a region as a sink, a bathroom, a kitchen, or the like, where water is easily splashed. In order to further increase the anti-slip effect of the anti-slip floor tile, the surface of the coating layer 50 is further pressed by an embossing plate to form a deep embossing pattern 40 as shown in FIG. 2, and the deep embossing pattern 40 may be a wavy embossing pattern, with embossing stripes thereof having a depth of 0.1 mm to 0.8 mm, for example 0.3 mm. It can be understood that, in other embodiments of the present disclosure, the surface of the coating layer 50 may form a shallow embossing pattern 41 as shown in FIG. 4, with embossing stripes of the shallow embossing pattern 41 having a depth of less than 0.05 mm.

Sixth Embodiment

Referring to FIG. 2, the anti-slip floor tile provided in an embodiment of the present disclosure includes a coating layer 50, a wear resistant layer 30, a decorative layer 20 and a base layer 10. The coating layer 50, the wear resistant layer 30, the decorative layer 20 and the base layer 10 are sequentially disposed from top to bottom.

In the present disclosure, the decorative layer 20 is made of a plastic film and has a thickness of 0.05 mm to 0.1 mm. A top surface of the decorative layer 20 is coated with ink to from a decorative pattern of the anti-slip floor tile, to provide a visual effect and a decorative effect for the anti-slip floor tile.

The base layer 10 is disposed under and in direct contact with the decorative layer 20. The base layer 10 can be formed by mixing and calendaring PVC powder, a plasticizer, an additive, and a filler together.

The wear resistant layer 30 is disposed above and in direct contact with the decorative layer 20. The wear resistant layer 30 is composed of a layer of non-rigid or semi-rigid plastic film, and has a thickness of 0.1 mm to 1 mm. In the present disclosure, the non-rigid plastic refers to a plastic having a flexural modulus or a tensile modulus (when the flexural modulus is not applicable) of lower than 70 MPa in specified conditions. The semi-rigid plastic refers to a plastic having a flexural modulus or a tensile modulus (when the flexural modulus is not applicable) from 70 MPa to 700 MPa in specified conditions.

A material of the wear resistant layer 30 includes a plasticizer, a thermoplastic resin, a plurality of first mineral particles 31, and other additives. The wear resistant layer 30 includes 25% to 45% of the plasticizer, 50% to 65% of the thermoplastic resin, 10% to 30% of the first mineral particles 31, and 1% to 5% of the other additives. The mass percentage of the components of the wear resistant layer 30 are given to the above value, so that the floor tile could have a good slip resistance, a good wear resistance, a good scratch resistance and a good conformability. In this embodiment, the plasticizer may be a solid plasticizer, a liquid plasticizer, or a mixture of a solid plasticizer and a liquid plasticizer. The solid plasticizer includes at least one of EPDM (Ethylene Propylene Diene Monomer), modified TPU (Thermoplastic polyurethanes), modified PU (polyurethane) and modified PP (Polypropylene). The liquid plasticizer includes at least one of a phthalate plasticizer, a fatty acid ester plasticizer, an aliphatic dibasic acid plasticizer, a phosphate plasticizer, an epoxy compound plasticizer, chlorine-containing plasticizer, and a trimellitate plasticizer. In this embodiment, the thermoplastic resin is PVC powder. The other additives may be at least one of usual additives for PVC, such as a stabilizer, a flame retardant, a smoke suppressant, and an antioxidant. The first mineral particles 31 may be inorganic mineral particles such as alumina particles, silica particles, glass sand or silicon carbide particles, and may have a Mohs hardness of not less than 6, and the shape of the first particles 31 may be an irregular or a regular shape. In the present embodiment, the first mineral particles 31 are dispersed in a thermoplastic resin and have a particle size of 0.05 mm to 1.0 mm, with the diameter of the largest particles being smaller than or substantially equal to the thickness of the wear resistant layer 30. In the present embodiment, the first mineral particles 31 are added in an amount of 10% to 30%, so that the first mineral particles 31 can be stably wrapped by the thermoplastic resin, to obtain a uniform and smooth wear resistant layer 30, and these first mineral particle 31 can act as an anti-slip and wear resistant skeleton of the wear resistant layer 30.

The coating layer 50 is disposed above and in direct contact with the wear resistant layer 30 and has a thickness of 0.01 mm to 0.02 mm. The coating layer 50 is made of a UV coating, which is an ultraviolet photosensitive urethane acrylate coating. The urethane acrylate coating includes a poly urethane acrylate prepolymer, an acrylate monomer, a fluorosilane, a photoinitiator, and a wetting agent. The UV coating includes 20% to 50% of poly urethane acrylate prepolymer, 20% to 40% of acrylate monomer, 0.5% to 3.0% of fluorosilane, 2% to 8% of photoinitiator, 0.5% to 5% of wetting agent. In this embodiment, the photoinitiator is, for example, 2-hydroxy-2-methyl-1-phenylacetone, the wetting agent is, for example, TEGO Twin4000, and the viscosity of the poly urethane acrylate prepolymer in this embodiment is less than 200 CPS, the surface energy of the acrylate monomer is less than 28, making the UV coating easy to wet the solid surface.

Furthermore, the coating layer 50 further includes a plurality of water absorbing particles uniformly dispersed in the coating layer 50. The water absorbing particles may be hydrogel particles, silica gel particles, water swellable rubber particles or the like. The water absorbing particles can protrude out from the surface of the coating layer 50 due to water absorption, and plays a role of anti-slip, so that the anti-slip floor tile of the present disclosure has an excellent anti-slip effect in a region as a sink, a bathroom, a kitchen, or the like, where water is easily splashed. In the laminating operation, the water absorbing particles are added to the UV coating in a predetermined ratio (for example, the mass percentage of the water absorbing particles to the UV coating is from 20:100 to 50:100) and uniformly stirred, and then coated and cured. In order to further increase the anti-slip effect of the anti-slip floor tile, the surface of the coating layer 50 may be pressed by an embossing plate to form a wavy deep embossing pattern 40 of FIG. 2, with embossing stripes thereof having a depth of 0.1 mm to 0.8 mm (for example, 0.3 mm), or to form a shallow embossing pattern 41 of FIG. 4, with embossing stripes thereof having a depth of less than 0.05 mm.

In summary, the present disclosure has at least one of the following advantages:

1. The floor tile has good anti-slip performance by uniformly distributing mineral particles in the surface layer (the wear resistant layer or the coating layer) of the floor tile.

2. In some embodiments of the present disclosure, the mineral particles are distributed in both of the wear resistant layer and the coating layer, so that the floor tile could keep the anti-slip performance throughout the life cycle of the floor tile, even though the surface of the floor tile of the present disclosure loses the anti-slip effect because of the abrasion of the surface embossing pattern and the coating layer.

3. In some embodiments of the present disclosure, the mineral particles in the wear resistant layer are always tightly bonded to the thermoplastic resin, which can avoid the interface separation between the mineral particles and the thermoplastic resin due to temperature decrease, and improve the low temperature resistance of the anti-slip floor tile.

4. In some embodiments of the present disclosure, the arrangement of the hydrogel monomer or the water absorbing particles enables the anti-slip floor tile of the present disclosure to have an excellent anti-slip effect in a region as a sink, a bathroom, a kitchen, or the like, where water is easily splashed.

In the present disclosure, the term "comprising", "including" "containing" or any other variants thereof is intended to encompass a non-exclusive inclusion, in addition to those listed, and may include other elements not specifically listed.

The above is only specific embodiments of the present disclosure, but the scope of the present disclosure is not limited thereto, any changes or substitutions could be easily obtained by persons skilled in the art within the technical scope of the present disclosure should be covered by the scope of the present disclosure. Therefore, the scope of the invention should be determined by the scope of the appended claims.

What is claimed is:

1. An anti-slip floor tile comprising:
a base layer, a decorative layer on the base layer, and a wear resistant layer on the decorative layer, wherein the wear resistant layer comprises a non-rigid or semi-rigid thermoplastic resin, and a plurality of first mineral particles uniformly distributed inside the thermoplastic resin;
if the thermoplastic resin is a non-rigid thermoplastic resin, a flexural modulus or a tensile modulus of the thermoplastic resin is less than 70 MPa, if the thermoplastic resin is a semi-rigid thermoplastic resin, a flexural modulus or a tensile modulus of the thermoplastic resin is from 70 MPa to 700 MPa,
the anti-slip floor tile further comprises a coating layer on the wear resistant layer, the coating layer comprises 20% to 50% of poly urethane acrylate prepolymer, 20% to 40% of acrylate monomer, 0.5% to 3.0% of fluorosilane, 2% to 8% of photoinitiator, 0.5% to 5% of wetting agent, the viscosity of the poly urethane acrylate prepolymer is less than 200 CPS, the surface energy of the acrylate monomer is less than 28.

2. The anti-slip floor tile according to claim 1, wherein the wear resistant layer comprises 25% to 45% of the plasticizer, 50% to 65% of the thermoplastic resin, 10% to 30% of the first mineral particles, and 1% to 5% of the other additives.

3. The anti-slip floor tile according to claim 1, wherein the first mineral particles are alumina particles, silica particles, glass sand or silicon carbide particles.

4. The anti-slip floor tile according to claim 1, wherein the first mineral particles have a Mohs hardness of not less than 6.

5. The anti-slip floor tile according to claim 1, wherein the first mineral particles have a particle size of 0.05 mm to 1.0 mm and a diameter of largest particles is less than or substantially equal to a thickness of the wear resistant layer.

6. The anti-slip floor tile according to claim 1, wherein the surface of the first mineral particles is coated with a surface modification layer, and the surface modification layer is a coupling agent modification layer, the thermoplastic resin and the surface modification layer of the first mineral particles are bonded together by chemical chains.

7. The anti-slip floor tile according to claim 1, wherein the coating layer comprises a plurality of second mineral particles uniformly dispersed in the coating layer.

8. The anti-slip floor tile according to claim 7, wherein the second mineral particles have a particle size of 0.01 mm to 0.04 mm and a diameter of the second mineral particles is greater than or equal to a thickness of the coating layer.

9. The anti-slip floor tile according to claim 7, wherein the coating layer comprises a plurality of water absorbing particles or hydrogel monomers uniformly dispersed in the coating layer.

10. The anti-slip floor tile according to claim 2, wherein the plasticizer is a solid plasticizer, a liquid plasticizer, or a mixture of a solid plasticizer and a liquid plasticizer.

11. The anti-slip floor tile according to claim 10, wherein the solid plasticizer includes at least one of EPDM, modified TPU, modified PU and modified PP, the liquid plasticizer includes at least one of a phthalate plasticizer, a fatty acid ester plasticizer, an aliphatic dibasic acid plasticizer, a phosphate plasticizer, an epoxy compound plasticizer, a chlorine-containing plasticizer, and a trimellitate plasticizer.

12. The anti-slip floor tile according to claim 1, wherein the photoinitiator is 2-hydroxy-2-methyl-1-phenylacetone, and the wetting agent is TEGO Twin4000.

13. The anti-slip floor tile according to claim 1, wherein the surface of the wear resistant layer is further pressed by an embossing plate to form a deep embossing pattern, the deep embossing pattern is configured in wave shape with embossing stripes of the deep embossing pattern having a depth from 0.1 mm to 0.8 mm.

14. The anti-slip floor tile according to claim 1, wherein the surface of the wear resistant layer has a shallow embossing pattern, the shallow embossing pattern is a substantially flat pattern, with depths of embossing stripes of the shallow embossing pattern being less than 0.05 mm.

* * * * *